(12) United States Patent
Jeon et al.

(10) Patent No.: US 10,727,733 B2
(45) Date of Patent: Jul. 28, 2020

(54) SEMICONDUCTOR DEVICE AND SYSTEM

(71) Applicant: Samsung Electronics Co., Ltd., Suwon-si, Gyeonggi-do (KR)

(72) Inventors: Ho Yeon Jeon, Hwaseong-si (KR); Hwa Yeal Yu, Bucheon-si (KR); Seung Gyu Lee, Ulsan (KR); Eun Suk Kim, Hwaseong-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 195 days.

(21) Appl. No.: 15/651,448

(22) Filed: Jul. 17, 2017

(65) Prior Publication Data

US 2018/0138806 A1    May 17, 2018

(30) Foreign Application Priority Data

Nov. 16, 2016    (KR) .................. 10-2016-0152390

(51) Int. Cl.
*G06F 1/32* (2019.01)
*G06F 1/26* (2006.01)
*H02M 1/32* (2007.01)
*G06F 1/30* (2006.01)
*G06F 1/28* (2006.01)
*H02M 1/08* (2006.01)
*H02M 3/158* (2006.01)
*H02M 1/00* (2006.01)

(52) U.S. Cl.
CPC ............... *H02M 1/32* (2013.01); *G06F 1/28* (2013.01); *G06F 1/30* (2013.01); *H02M 1/08* (2013.01); *H02M 3/158* (2013.01); *H02M 2001/0009* (2013.01)

(58) Field of Classification Search
CPC ............... H02M 1/32; G06F 1/32; G06F 1/26
USPC ..................................................... 713/340
See application file for complete search history.

(56) References Cited

U.S. PATENT DOCUMENTS 6,631,066 B1    10/2003    Smith et al.
7,689,851 B2 *   3/2010    Sawyers .............. G06F 1/3203
                                                       713/323
8,320,087 B2    11/2012    Lin
(Continued)

FOREIGN PATENT DOCUMENTS

JP              3833558 B2    10/2006

*Primary Examiner* — Phil K Nguyen
(74) *Attorney, Agent, or Firm* — Harness, Dickey & Pierce, P.L.C.

(57) ABSTRACT

A semiconductor device includes an inductor selectively connected to a power supply voltage and configured to store and release energy; a first transistor connected between the power supply voltage and the inductor and configured to provide the power supply voltage to the inductor; a second transistor connected to the first transistor in series, connected between the inductor and a ground voltage, and configured to provide the ground voltage to the inductor; a modulator configured to provide a modulation signal to a control circuit configured to control the first and second transistors by performing pulse width modulation (PWM); a current sensor configured to sense an amount of current passing through the first transistor and generate a first output signal based on the sensed amount of current; and a first overcurrent protection output generator configured to generate a second output signal based on the first output signal and a first reference signal.

19 Claims, 12 Drawing Sheets

(56) References Cited

U.S. PATENT DOCUMENTS

| | | |
|---|---|---|
| 8,654,483 B2 | 2/2014 | Etter |
| 9,755,514 B2 * | 9/2017 | Pullen .................... H02M 3/158 |
| 2006/0007714 A1 * | 1/2006 | Hua ........................ H02M 1/32 |
| | | 363/24 |
| 2009/0146629 A1 | 6/2009 | Kim |
| 2014/0068299 A1 * | 3/2014 | Koinuma .................. G06F 1/28 |
| | | 713/322 |
| 2014/0292292 A1 * | 10/2014 | Koski .................. H02H 7/1213 |
| | | 323/271 |

* cited by examiner

SEMICONDUCTOR DEVICE AND SYSTEM

This application claims priority to Korean Patent Application No. 10-2016-0152390 filed on Nov. 16, 2016 in the Korean Intellectual Property Office, and all the benefits accruing therefrom under 35 U.S.C. § 119, the disclosure of which is incorporated herein by reference in its entirety.

BACKGROUND

1. Field

The present disclosure relates to a semiconductor device and/or system.

2. Description of the Related Art

A power management integrated circuit (PMIC), which supplies power to an application processor (AP), performs overcurrent protection to protect its internal circuitry. In a case in which an overcurrent is generated during the operation of the AP, the PMIC may limit the amount of current provided to the AP. In this case, however, a drop in the driving voltage of the AP may occur, and if the driving voltage of the AP drops even below a minimum level for driving the AP, the AP may not be able to function properly.

The PMIC may use a direct current-to-direct current (DC-to-DC) converter such as, for example, a buck converter, or a voltage regulator to provide a low voltage that meets requirements from the AP.

The PMIC is required to perform overcurrent protection on, for example, a buck converter, and at the same time, prevent the operation of the AP, which is supplied with power by the buck converter, from being terminated.

SUMMARY

Some example embodiments provide a semiconductor device capable of stably supplying power to an application processor (AP) while performing overcurrent protection on a buck converter.

Some example embodiments also provide a semiconductor system capable of stably supplying power to an AP while performing overcurrent protection on a buck converter.

However, example embodiments are not restricted to those set forth herein. The above and other example embodiments will become more apparent to one of ordinary skill in the art by referencing the detailed description given below.

According to an example embodiment, there is provided a semiconductor device including an inductor selectively connected to a power supply voltage and configured to store and release energy; a first transistor connected between the power supply voltage and the inductor and configured to provide the power supply voltage to the inductor; a second transistor connected to the first transistor in series, connected between the inductor and a ground voltage, and configured to provide the ground voltage to the inductor; a modulator configured to provide a modulation signal to a control circuit configured to control the first and second transistors by performing pulse width modulation (PWM); a current sensor configured to sense an amount of current passing through the first transistor and generate a first output signal based on the sensed amount of current; and a first overcurrent protection output generator configured to generate a second output signal based on the first output signal and a first reference signal.

According to another example embodiment, there is provided a semiconductor device including a first transistor connected to a power supply voltage and configured to provide the power supply voltage to a first node; a second transistor connected to the first transistor in series, connected between the first node and a ground voltage, and configured to provide the ground voltage to the first node; a third transistor connected to the power supply voltage and configured to be gated by a same signal as the first transistor; a first overcurrent protection output generator configured to generate a first result output signal based on an amount of current passing through a drain of the first transistor and an amount of current passing through a drain of the third transistor; a fourth transistor connected to the third transistor in series and configured to be gated by the first result output signal of the first overcurrent protection output generator and to provide a first output signal, the fourth transistor being configured to generate the first output signal based on a voltage of a source of the fourth transistor; and a second overcurrent protection output generator configured to generate a second output signal based on the first output signal and a first reference signal.

According to still another example embodiment, —there is provided a semiconductor system including an inductor selectively connected to a power supply voltage and configured to store and release energy; a first transistor connected between the power supply voltage and the inductor and configured to provide the power supply voltage to the inductor; a second transistor connected to the first transistor in series, connected between the inductor and a ground voltage, and configured to provide the ground voltage to the inductor; a modulator configured to provide a modulation signal to a control circuit, configured to control the first and second transistors by performing PWM; a current sensor configured to sense an amount of current passing through the first transistor and generate a first output signal based on the sensed amount of current; a first overcurrent protection output generator configured to generate a second output signal based on the first output signal and a first reference signal, and to provide the second output signal to an application processor (AP); and a processing core disposed in the AP, an operating environment of the processing core being configured to vary according to the second output signal.

According to still another example embodiment, there is provided a semiconductor system including a first transistor connected to a power supply voltage and configured to provide the power supply voltage to a first node; a second transistor connected to the first transistor in series, connected between the first node and a ground voltage, and configured to provide the ground voltage to the first node; a third transistor connected to the power supply voltage and configured to be gated by a same signal as the first transistor; a first overcurrent protection output generator configured to generate a first result output signal based on an amount of current passing through a drain of the first transistor and an amount of current passing through a drain of the third transistor; a fourth transistor connected to the third transistor in series and configured to be gated by the first result output signal of the first overcurrent protection output generator and to provide a first output signal, the fourth transistor being configured to generate the first output signal based on a voltage of a source of the fourth transistor; a second overcurrent protection output generator configured to generate a second output signal based on the first output signal and a first reference signal, and to provide the second output signal to an AP; and a processing core disposed in the AP, an operating environment of the processing core being configured to vary according to the second output signal.

Other features and example embodiments may be apparent from the following detailed description, the drawings, and the claims.

BRIEF DESCRIPTION OF THE DRAWINGS

The above and other example embodiments and features will become more apparent by describing in detail example embodiments with reference to the attached drawings, in which.

DETAILED DESCRIPTION

Figure 1:
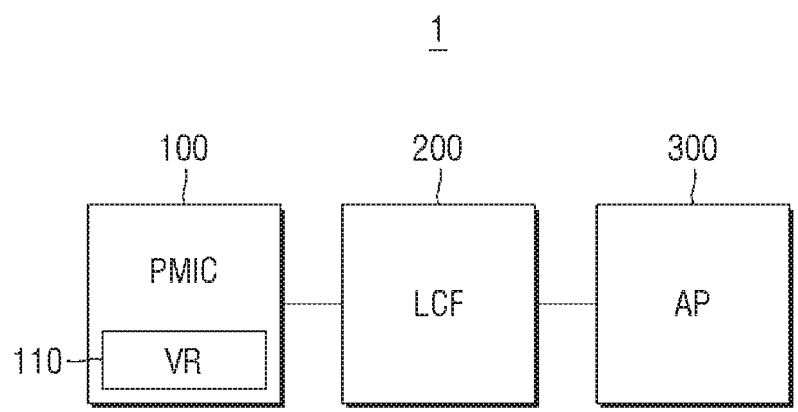
FIG. 1 is a block diagram of a semiconductor system according to an example embodiment.

FIG. 1 is a block diagram of a semiconductor system according to an example embodiment.

Referring to FIG. 1, a semiconductor system 1 includes a power management integrated circuit (PMIC) 100, an LC filter (LCF) 200 (e.g., an LC circuit), and an application processor (AP) 300.

The PMIC 100 receives power from a battery or an external power device and provides a driving voltage to the AP 300. The PMIC 100 may control the driving voltage and may control the supply of power to the AP 300.

The AP 300 is a system-on-chip (SoC), which supports applications executed in a mobile operating system environment. The AP 300 may include various modules such as a processing core, a memory, an input/output (I/O) interface, and the like, and the type of implementation of the AP 300 may vary as necessary. In some example embodiments, the various modules of the AP 300 may be implemented by hardware components. In some other example embodiments, the various modules of the AP 300 may be implemented by a combination of hardware and software, such as by a processor executing software programs.

A driving voltage required for driving the AP 300 may be lower than a power supply voltage provided to the PMIC 100 by a battery or an external power device. Thus, the PMIC 100 may include a voltage converter or voltage regulator (VR) 110, which converts the power supply voltage provided by the battery or the external power device into the driving voltage required for driving the AP 300.

The VR 110 may be implemented in various forms. For example, the VR 110 may be implemented as a buck converter, but some other example embodiments are not limited thereto. That is, in some other example embodiments, the VR 110 may encompass various types of converter circuits obtained by modifying a buck converter and other types of converter circuits.

A buck converter is a direct current-to-direct current (DC-to-DC) converter. A buck converter generally includes a switch and an inductor and a capacitor for filtering an output voltage. In theory, a buck converter may generally be implemented in the PMIC 100, but the inductor and the capacitor of the buck converter may actually be realized on a circuit board as the LCF 200. Accordingly, a buck converter is illustrated in FIG. 1 as covering the range from the inside of the PMIC 100 (i.e., the VR 110) to the outside of the PMIC 100 (i.e., the LCF 200).

However, some other example embodiments are not limited to what is illustrated in FIG. 1. That is, in some other example embodiments, the LCF 200 may be implemented inside the PMIC 100, and this type of modification is also applicable to some other example embodiments that will be described later.

Figure 2:
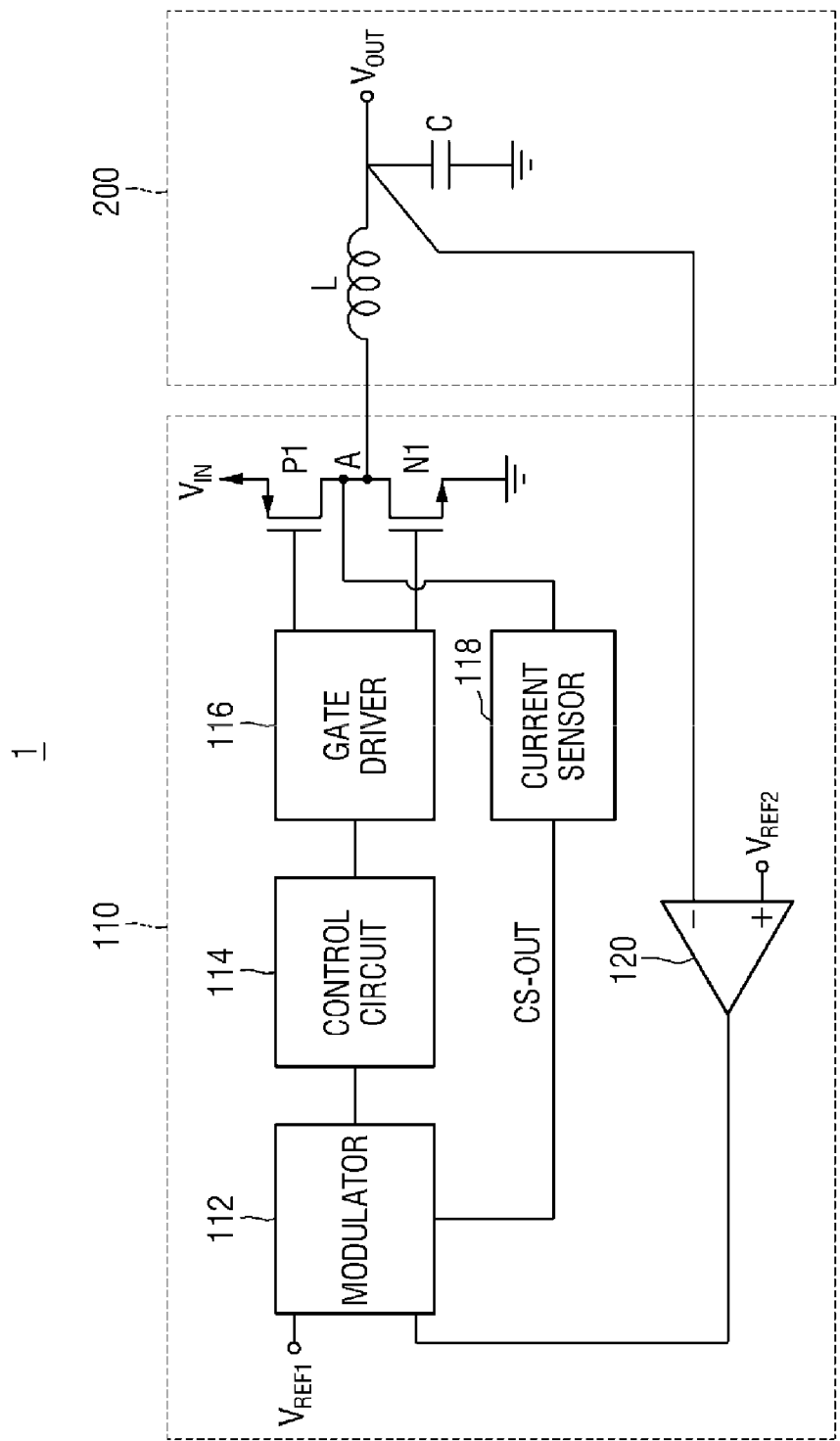
FIG. 2 is a circuit diagram of the semiconductor system of FIG. 1.

FIG. 2 is a circuit diagram of the semiconductor system of FIG. 1.

Referring to FIG. 2, the semiconductor system 1 includes a VR 110 comprising at least transistors P1 and N1, a modulator 112, a control circuit 114, a gate driver 116, a current sensor 118, and an overcurrent protection output generator, which may include a comparator 120 in some example embodiments.

However, some other example embodiments of the overcurrent protection output generator may not be limited to a comparator. The semiconductor system 1 further includes an LCF 200 comprising at least an inductor L and a capacitor C.

The transistor P1 is connected between a power supply voltage $V_{IN}$ and the inductor L and provides the power supply voltage $V_{IN}$ to the inductor L. For example, the transistor P1 may include a p-channel metal-oxide-semiconductor (PMOS) transistor.

The transistor N1 is connected to the transistor P1 in series, is also connected between the inductor L and a ground voltage, and provides the ground voltage to the inductor L. For example, the transistor N1 may include an n-type metal-oxide-semiconductor (NMOS) transistor.

The inductor L is selectively connected to the power supply voltage $V_{IN}$ and stores and releases energy. More specifically, the inductor L may be selectively connected to the power supply voltage $V_{IN}$ via the transistor P1, which is repeatedly turned on and off by the control circuit 114 and the gate driver 116. In response to the transistor P1 being turned on, the inductor L stores energy supplied by the power supply voltage $V_{IN}$ therein, and in response to the transistor P1 being turned off and the transistor N1 being turned on, the inductor L releases the energy stored therein.

The modulator 112 performs pulse width modulation (PWM) and thus provides a modulation signal to the control circuit 114, which controls the transistors P1 and N1. More specifically, the modulator 112 provides a modulation signal having a predetermined duty cycle, or alternatively a desired duty cycle, to the control circuit 114.

The control circuit 114 receives the modulation signal provided by the modulator 112 and controls the gate driver 116. The gate driver 116 provides a gate driving signal to the transistors P1 and N1.

To store the energy supplied by the power supply voltage $V_{IN}$, the control circuit 114 and the gate driver 116 selectively turn on or off the transistor P1 according to a predetermined duty cycle, or alternatively a desired duty cycle. To discharge the energy stored in the inductor L, the control circuit 114 and the gate driver 116 selectively turn on or off the transistor N1 according to the predetermined or otherwise desired duty cycle.

The discharge of energy may be performed via a load, and the load may be the AP 300. An output voltage $V_{OUT}$ may be lower than the power supply voltage $V_{IN}$.

The overcurrent protection output generator of VR 110 generates a result output signal based on an output voltage of the inductor L and a reference voltage, and provides the result output signal to the modulator 112. In some example embodiments where the overcurrent protection output generator includes a comparator, such as the example embodiment shown in FIG. 2, the comparator 120 compares the output voltage $V_{OUT}$ with a reference voltage $V_{REF2}$ and feeds back the result of the comparison to the modulator 112. That is, the comparator 120 detects when the output voltage $V_{OUT}$ drops below the reference voltage $V_{REF2}$, and transmits information indicating that the current flowing in the inductor L may become an overcurrent to the modulator 112. The modulator 112 may compare the output voltage $V_{OUT}$ with a reference voltage $V_{REF1}$ and may generate a modulation signal based on the result of the comparison.

The current sensor 118 senses the amount of current passing through the transistor P1 and generates an output signal CS_OUT based on the result of the sensing. The PMIC 100 may perform overcurrent protection using the output signal CS_OUT.

For example, in a case in which the amount of current passing through the transistor P1 exceeds a particular reference amount, the output signal CS_OUT may be fed back to the modulator 112. In this case, the modulator 112, the control circuit 114, and the gate driver 116 may not provide any additional current to the load (i.e., the AP 300).

In a case in which overcurrent protection is performed in the aforementioned manner, a drop in the driving voltage of the AP 300 may occur. If the amount by which the driving voltage of the AP 300 drops is too large, the AP 300 may not be able to operate normally. Thus, an overcurrent protection method for ensuring a normal operation of the AP 300 is needed, and will be described later with reference to FIGS. 3 to 13.

Figure 3:
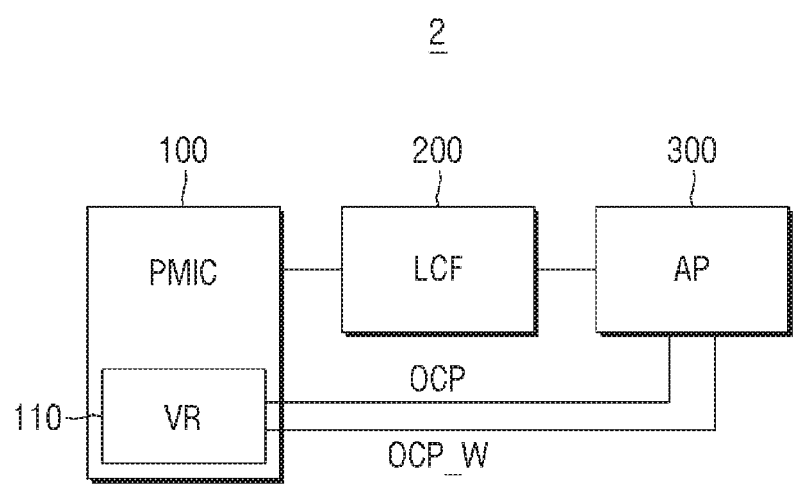
FIG. 3 is a block diagram of a semiconductor system according to another example embodiment.
Figure 4:
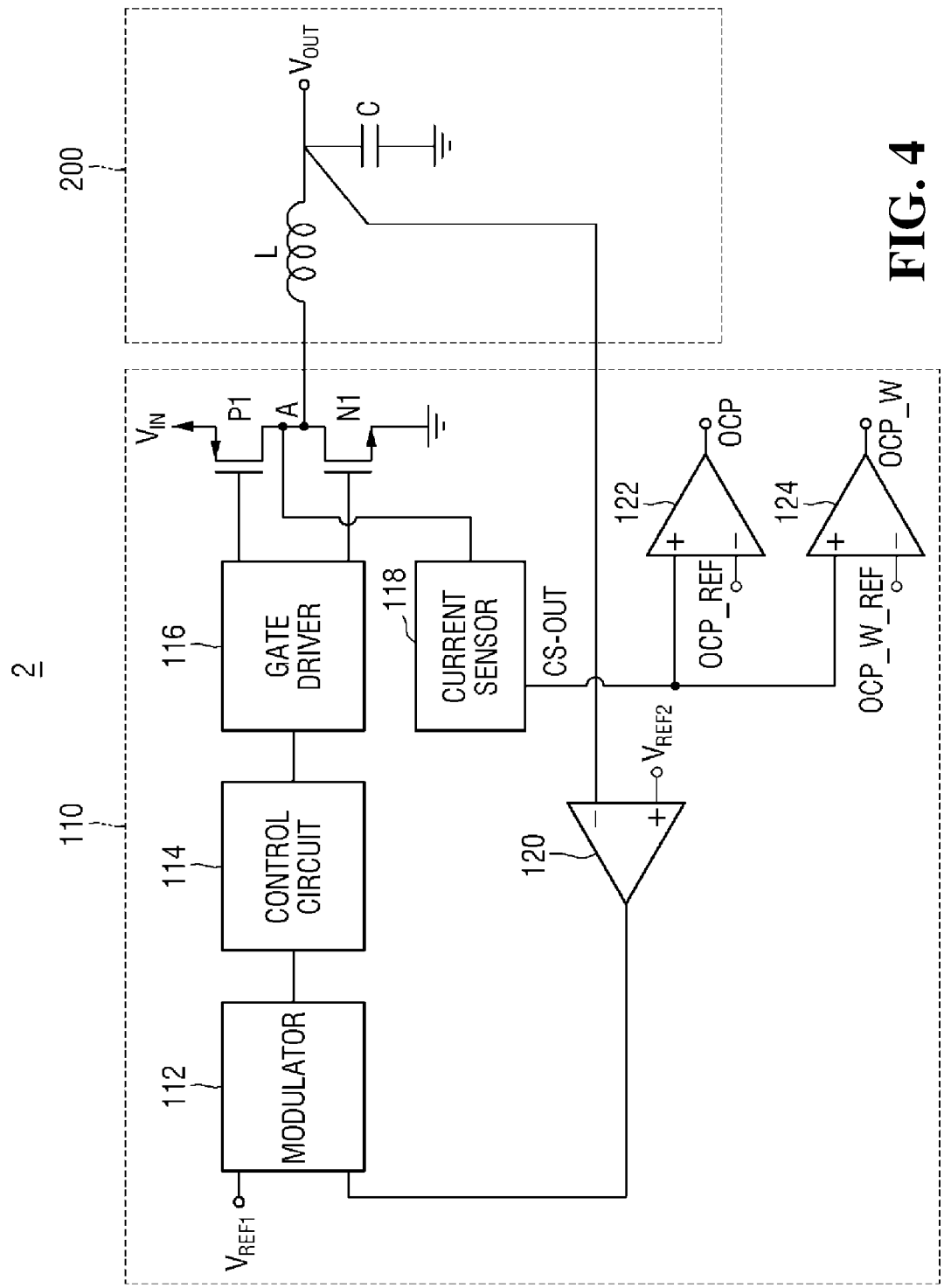
FIG. 4 is a circuit diagram of the semiconductor system of FIG. 3.

FIG. 3 is a block diagram of a semiconductor system according to another example embodiment, and FIG. 4 is a circuit diagram of the semiconductor system of FIG. 3.

Referring to FIG. 3, a semiconductor system 2 includes a PMIC 100, an LCF 200, and an AP 300.

In the semiconductor system 2, unlike in the semiconductor system 1 of FIG. 1, an output signal OCP and an output signal OCP_W are output from a VR 110, which is included in the PMIC 100, to the outside of the PMIC 100.

The output signal OCP and the output signal OCP_W, which are output to the outside of the PMIC 100, are provided to the AP 300, thereby allowing the AP 300 to perform throttling or performance control upon the detection of an overcurrent.

Throttling may be performed by, for example, controlling a clock signal driving a processing core included in the AP 300. For example, in response to an overcurrent being detected, the AP 300 may control the operating speed by dividing a clock signal or performing clock gating.

Performance control may be performed by, for example, limiting the number of instructions processed by the processing core of the AP 300. For example, in response to an overcurrent being detected, the AP 300 may process less than a predetermined number, or alternatively a desired number, of load/store instructions or may control the speed of processing other instructions.

By reducing the amount of current consumed by the AP 300 in the aforementioned manner, a normal operation of the AP 300 may be ensured, and at the same time, an overcurrent situation may be escaped or avoided.

Referring to FIG. 4, in the semiconductor system 2, unlike in the semiconductor system 1 of FIG. 1, an output signal CS_OUT is input to a pair of overcurrent protection output generators, which may include comparators 122 and 124 in some example embodiments, instead of being fed back to a modulator 112. However, some other example embodiments of overcurrent protection output generators may not be limited to comparators.

The pair of overcurrent protection output generators of VR 110 are each configured to generate output signals based on the output signal from the current sensor 118 and respective reference signals. In some example embodiments where the pair of overcurrent protection output generators include comparators, such as the example embodiment shown in FIG. 4, the comparator 122 generates the output signal OCP by comparing the output signal CS_OUT and a reference signal OCP_REF, and the comparator 124 generates the output signal OCP_W by comparing the output signal CS_OUT and a reference signal OCP_W_REF. The levels of the reference signals OCP_REF and OCP_W_REF may be set according to the purpose of implementation of the semiconductor system 2.

In some example embodiments, the level of the reference signal OCP_W_REF may be lower than the level of the reference signal OCP_REF.

Accordingly, in response to the amount of current passing through the drain of a transistor P1 reaching a second criterion, which is lower than a first criterion for determining an overcurrent, the semiconductor system 2 may output the output signal OCP_W first and then the output signal OCP.

For example, the AP 300 receives the output signal OCP_W first from the PMIC 100 and may begin throttling or performance control for overcurrent protection. If the amount of current consumed by the AP 300 is considerably reduced by throttling or performance control, a normal operation of the AP 300 may be ensured, and at the same time, an overcurrent situation may be escaped or avoided.

On the other hand, if the amount of current consumed by the AP 300 is not sufficiently reduced by throttling or performance control, the AP 300 may further receive the output signal OCP from the PMIC 100. In this case, the amount of current consumed by the AP 300 may be reduced by a more powerful method such as, for example, terminating the driving of the processing core of the AP 300.

Figure 5:
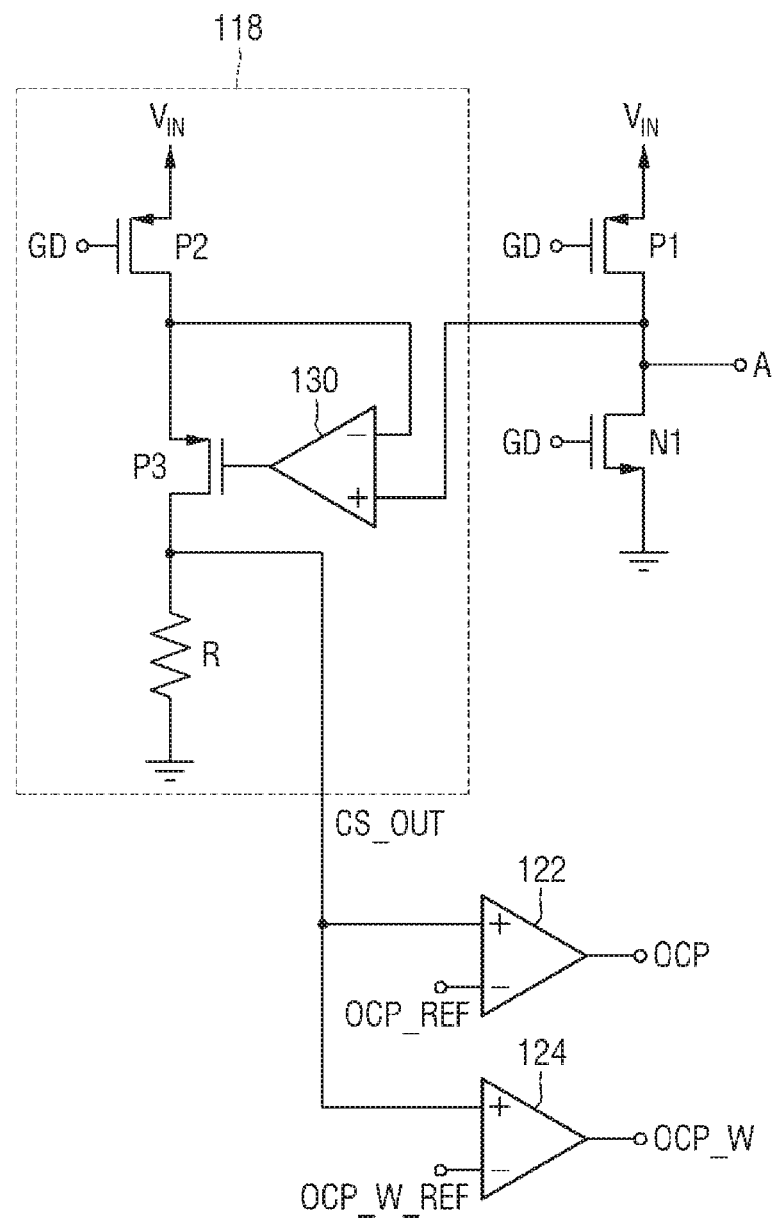
FIG. 5 is a circuit diagram of a current sensor of FIG. 4.

FIG. 5 is a circuit diagram of a current sensor of FIG. 4.

Referring to FIG. 5, a current sensor 118 senses the amount of current passing through the drain of the transistor P1 and generates the output signal CS_OUT. The current sensor 118 includes transistors P2 and P3 and an overcurrent protection output generator, which may include a comparator 130 in some example embodiments. However, in some other example embodiments the overcurrent protection output generator may not be limited to a comparator. A node A of FIG. 5 is the same as a node A of FIG. 4.

The transistor P2 is connected to a power supply voltage $V_{IN}$. The transistor P2, like the transistor P1, is controlled by a control circuit 114. In some example embodiments, the transistors P1 and P2 may be implemented in the form of a current mirror.

In some example embodiments, a current mirror having two transistors, i.e., the transistors P1 and P2, as its axes, is realized. However, some other example embodiments are not limited thereto. That is, in some other example embodiments, a current mirror may be realized using N transistors (where N is a natural number equal to or greater than 3).

The overcurrent protection output generator of the current sensor 118 is configured to generate a result output signal based on an amount of current passing through the drains of transistors P1 and P2, respectively. In some example embodiments where the overcurrent protection output generator includes a comparator, such as the example embodiment shown in FIG. 5, the comparator 130 compares the drain of the transistor P1 and the drain of the transistor P2 and outputs the result of the comparison. The transistor P3 is connected to the transistor P2 in series and is gated by the output of the comparator 130. The comparator 130 and the transistor P3 may perform the functions of a current-to-voltage converter.

The output signal CS_OUT, which is for performing overcurrent protection, is generated by the voltage of the source of the transistor P3. The pair of overcurrent protection output generators of VR 110 are each configured to generate output signals based on the output signal from the current sensor 118 and respective reference signals. In some example embodiments where the overcurrent protection output generators include comparators, such as the example embodiment shown in FIGS. 4 and 5, the comparator 122 compares the output signal CS_OUT and the reference signal OCP_REF and generates the output signal OCP, and the comparator 124 compares the output signal CS_OUT and the reference signal OCP_W_REF and generates the output signal OCP_W.

In some example embodiments, the level of the reference signal OCP_W_REF may be lower than the level of the reference signal OCP_REF.

Accordingly, in response to the amount of current passing through the drain of the transistor P1 reaching the second criterion, which is lower than the first criterion for determining an overcurrent, the semiconductor system 2 may output the output signal OCP_W first and then the output signal OCP.

Figure 6:
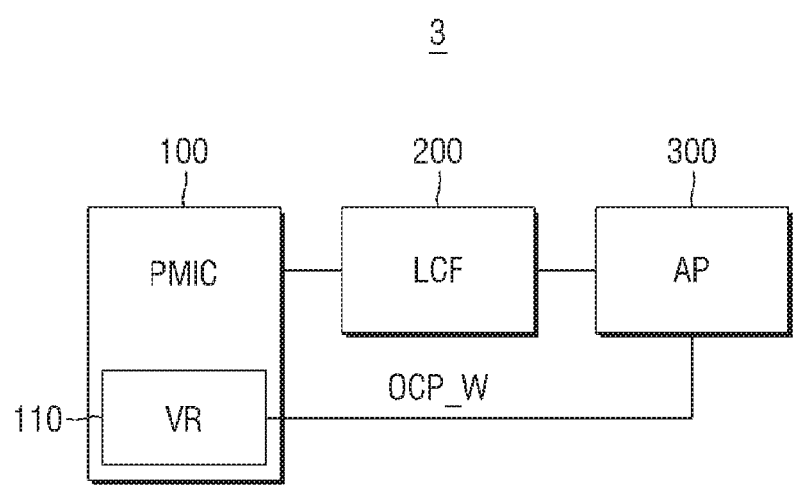
FIG. 6 is a block diagram of a semiconductor system according to another example embodiment.
Figure 7:
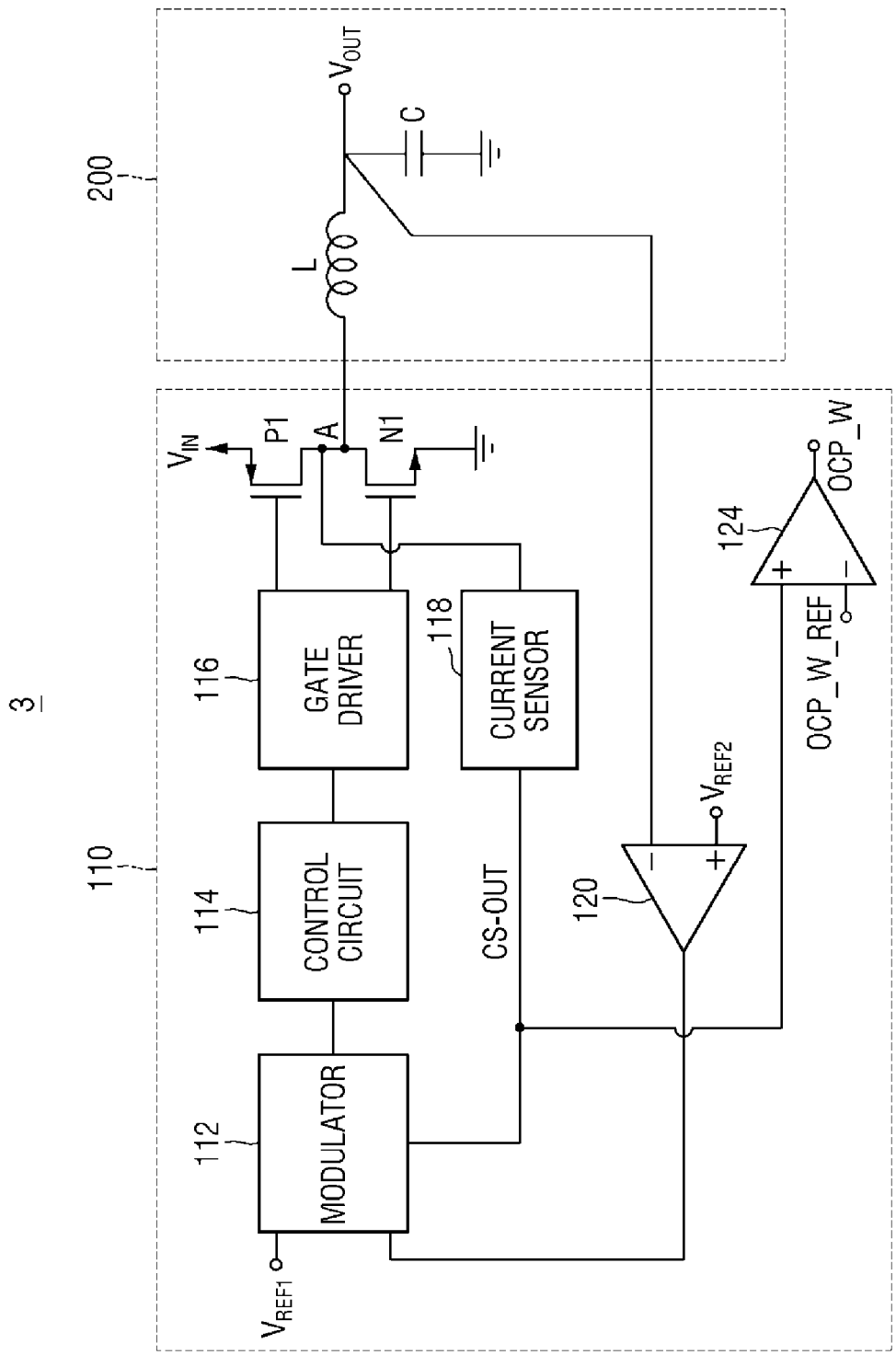
FIG. 7 is a circuit diagram of the semiconductor system of FIG. 6.

FIG. 6 is a block diagram of a semiconductor system according to another example embodiment, and FIG. 7 is a circuit diagram of the semiconductor system of FIG. 6.

Referring to FIG. 6, a semiconductor system 3 includes a PMIC 100, an LCF 200, and an AP 300.

In the semiconductor system 3, unlike in the semiconductor system 2 of FIG. 3, only an output signal OCP_W is output from a VR 110, which is included in the PMIC 100, to the outside of the PMIC 100.

The output signal OCP_W, which is output to the outside of the PMIC 100, is provided to the AP 300, thereby allowing the AP 300 to perform throttling or performance control upon the detection of an overcurrent.

By reducing the amount of current consumed by the AP 300 in the aforementioned manner, a normal operation of the AP 300 may be ensured, and at the same time, an overcurrent situation may be escaped or avoided.

Referring to FIG. 7, in the semiconductor system 3, unlike in the semiconductor system 2 of FIG. 4, an output signal CS_OUT is fed back to a modulator 112, and at the same time, input to an overcurrent protection output generator, which may include a comparator 124 in some example embodiments. However, in some other example embodiments, the overcurrent protection output generator may not be limited to a comparator.

The overcurrent protection output generator of VR 110 is configured to generate an output signal based on the output signal from the current sensor 118 and a reference signal. In some example embodiments where the overcurrent protection output generator includes a comparator, such as the example embodiment shown in FIGS. 7 and 8, the comparator 124 compares the output signal CS_OUT and a reference signal OCP_W_REF and generates an output signal OCP_W based on the result of the comparison. The level of the reference signal OCP_W_REF may be set according to the purpose of implementation of the semiconductor system 3.

Accordingly, in response to the amount of current passing through the drain of a transistor P1 reaching the second criterion, which is lower than the first criterion for determining an overcurrent, the PMIC 100 may output the output signal OCP_W first before cutting off the supply of an additional current to the AP 300 by a modulator 112, a control circuit 114, and a gate driver 116 of the semiconductor system 3.

For example, the AP 300 may receive the output signal OCP_W first from the PMIC 100 and may begin throttling or performance control for overcurrent protection. If the amount of current consumed by the AP 300 is considerably reduced by throttling or performance control, a normal operation of the AP 300 may be ensured, and at the same time, an overcurrent situation may be escaped or avoided.

On the other hand, if the amount of current consumed by the AP 300 is not sufficiently reduced by throttling or performance control, the modulator 112, the control circuit 114, and the gate driver 116 may not supply any additional current to a load (i.e., the AP 300), thereby escaping or avoiding an overcurrent situation.

Figure 8:
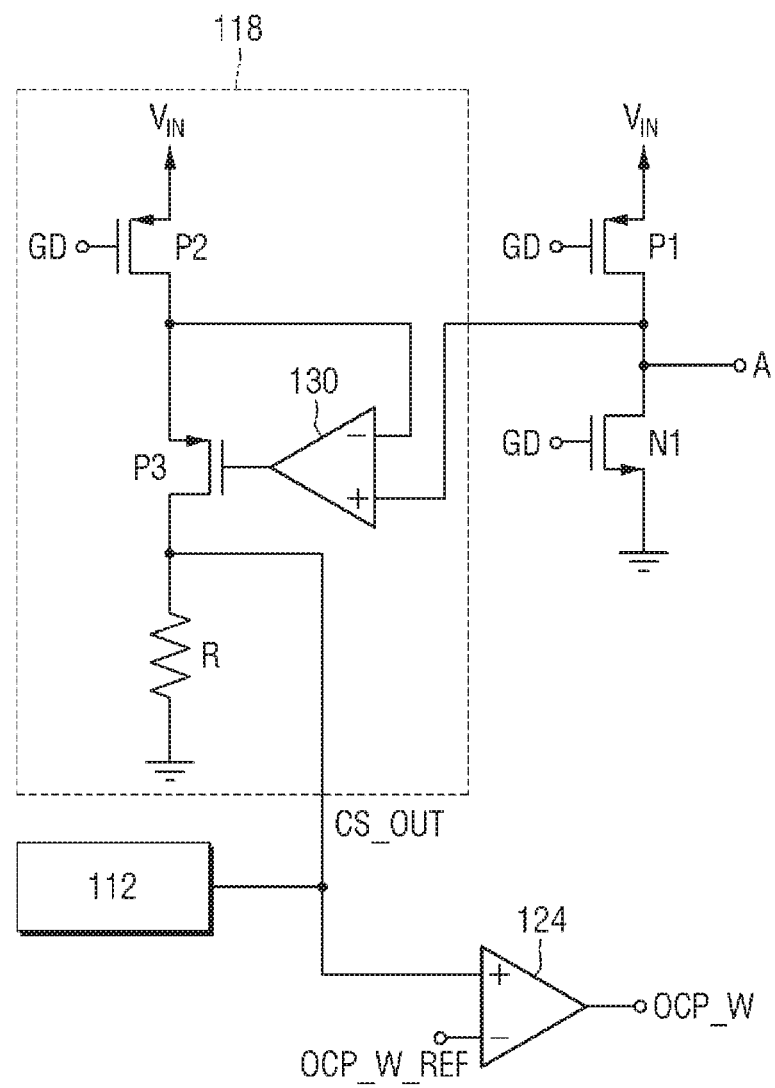
FIG. 8 is a circuit diagram of a current sensor of FIG. 7.

FIG. 8 is a circuit diagram of a current sensor of FIG. 7.

Referring to FIG. 8, a current sensor 118 senses the amount of current passing through the drain of the transistor P1 and generates the output signal CS_OUT. The current sensor 118 includes transistors P2 and P3 and an overcurrent protection output generator, which may include a comparator 130 in some example embodiments. However, in some other example embodiments the overcurrent protection output generator may not be limited to a comparator.

The output signal CS_OUT, which is for performing overcurrent protection, is generated based on the voltage of the source of the transistor P3. The overcurrent protection output generator of VR 110 is configured to generate an output signal based on the output signal from the current sensor 118 and a reference signal. In some example embodiments where the overcurrent protection output generator includes a comparator, such as the example embodiment shown in FIGS. 7 and 8, the comparator 124 compares the output signal CS_OUT and the reference signal OCP_W_REF and generates the output signal OCP_W.

Accordingly, in response to the amount of current passing through the drain of the transistor P1 reaching the second criterion, which is lower than the first criterion for determining an overcurrent, the PMIC 100 may output the output signal OCP_W first before cutting off the supply of an additional current to the AP 300 by the modulator 112, the control circuit 114, and the gate driver 116 of the semiconductor system 3.

Figure 9:
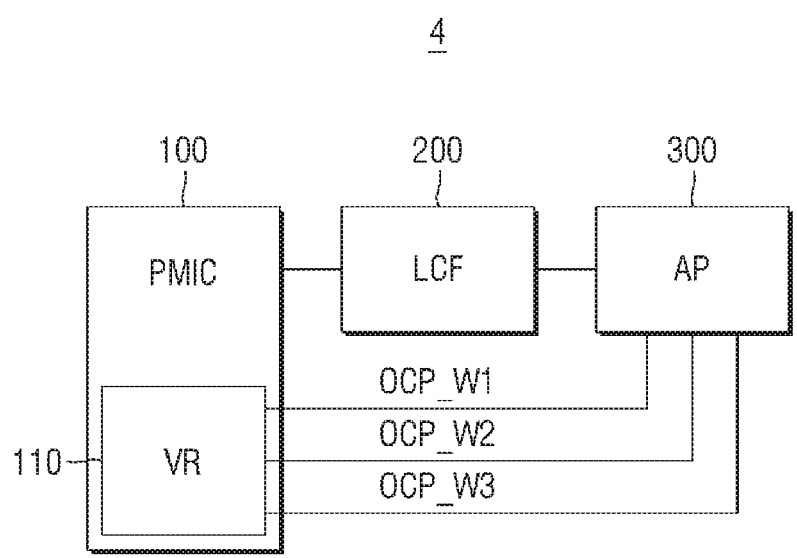
FIG. 9 is a block diagram of a semiconductor system according to another example embodiment.
Figure 10:
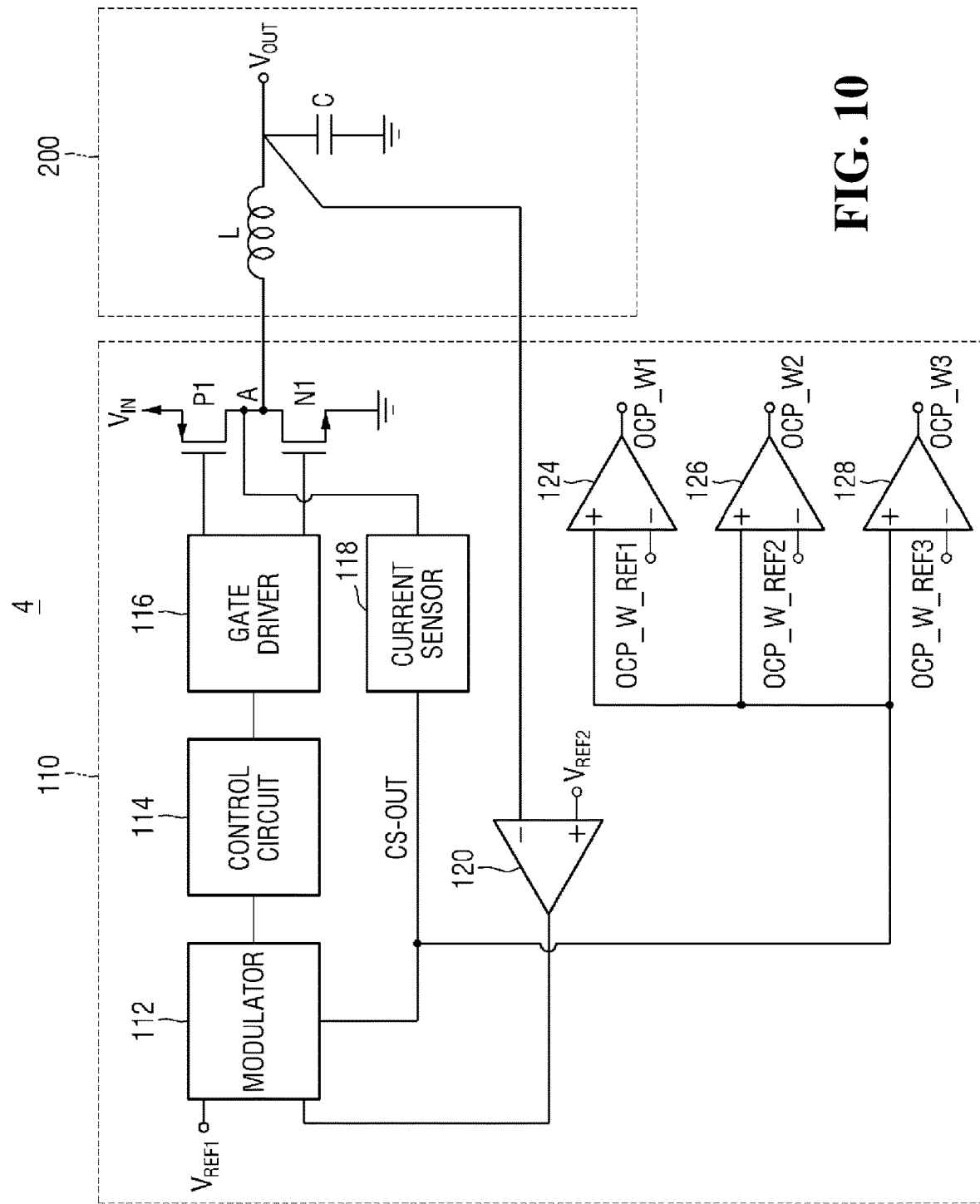
FIG. 10 is a circuit diagram of the semiconductor system of FIG. 9.

FIG. 9 is a block diagram of a semiconductor system according to another example embodiment, and FIG. 10 is a circuit diagram of the semiconductor system of FIG. 9.

Referring to FIG. 9, a semiconductor system 4 includes a PMIC 100, an LCF 200, and an AP 300.

In the semiconductor system 4, unlike in the semiconductor system 2 of FIG. 3, a plurality of output signals OCP_W1, OCP_W2, and OCP_W3 are output from a voltage converter 110, which is included in the PMIC 100, to the outside of the PMIC 100 at different times from one another.

The output signals OCP_W1, OCP_W2, and OCP_W3, which are output to the outside of the PMIC 100, are provided to the AP 300 at different times from one another, thereby allowing the AP 300 to perform throttling or performance control upon the detection of an overcurrent.

For example, in response to the output signal OCP_W1 being received first, the AP 300 may perform throttling or performance control at low intensity, in response to the output signal OCP_W2 being received after the receipt of the output signal OCP_W1, the AP 300 may perform throttling or performance control at medium intensity, and in response to the output signal OCP_W3 being received after the receipt of the output signal OCP_W2, the AP 300 may perform throttling or performance control at high intensity.

By reducing the amount of current consumed by the AP 300 in the aforementioned manner, a normal operation of the AP 300 may be ensured, and at the same time, an overcurrent situation may be escaped or avoided.

Referring to FIG. 10, in the semiconductor system 4, unlike in the semiconductor system 3 of FIG. 7, an output signal CS_OUT is fed back to a modulator 112, and at the same time, input to a plurality of overcurrent protection output generators, which may include comparators 124, 126, and 128 in some example embodiments. However, in some other example embodiments the overcurrent protection output generators may not be limited to comparators.

The plurality of overcurrent protection output generators of VR 110 are each configured to generate output signals based on the output signal from the current sensor 118 and respective reference signals. In some example embodiments where the overcurrent protection output generators include comparators, such as the example embodiment shown in FIGS. 10 and 11, the comparator 124 compares the output signal CS_OUT and a reference signal OCP_W_REF1 and generates an output signal OCP_W1 based on the result of the comparison, the comparator 126 compares the output signal CS_OUT and a reference signal OCP_W_REF2 and generates an output signal OCP_W2 based on the result of the comparison, and the comparator 128 compares the output signal CS_OUT and a reference signal OCP_W_REF3 and generates an output signal OCP_W3 based on the result of the comparison. The levels of the reference signals OCP_W_REF1, OCP_W_REF2, and OCP_W_REF3 may be set according to the purpose of implementation of the semiconductor system 4.

In some example embodiments, the level of the reference signal OCP_W_REF1 may be lower than the level of the reference signal OCP_W_REF2, and the level of the reference signal OCP_W_REF2 may be lower than the level of the reference signal OCP_W_REF3.

Accordingly, in response to the amount of current passing through the drain of a transistor P1 reaching the second criterion, which is lower than the first criterion for determining an overcurrent, the PMIC 100 may output the output signals OCP_W1, OCP_W2, and OCP_W3 first before cutting off the supply of an additional current to the AP 300 by the modulator 112, a control circuit 114, and a gate driver 116 of the semiconductor system 4. More specifically, the PMIC 100 may output the output signal OCP_W1, which corresponds to a lowest criterion, then the output signal OCP_W2, which corresponds to a second lowest criterion, and then the output signal OCP_W3, which corresponds to a highest criterion.

For example, in response to the output signal OCP_W1 being received first, the AP 300 may perform throttling or performance control at low intensity, in response to the output signal OCP_W2 being received after the receipt of the output signal OCP_W1, the AP 300 may perform throttling or performance control at medium intensity, and in response to the output signal OCP_W3 being received after the receipt of the output signal OCP_W2, the AP 300 may perform throttling or performance control at high intensity. If the amount of current consumed by the AP 300 is considerably reduced by throttling or performance control, a normal operation of the AP 300 may be ensured, and at the same time, an overcurrent situation may be escaped or avoided.

On the other hand, if the amount of current consumed by the AP 300 is not sufficiently reduced by throttling or performance control, the modulator 112, the control circuit 114, and the gate driver 116 may not supply any additional current to a load (i.e., the AP 300), thereby escaping or avoiding an overcurrent situation.

Figure 11:
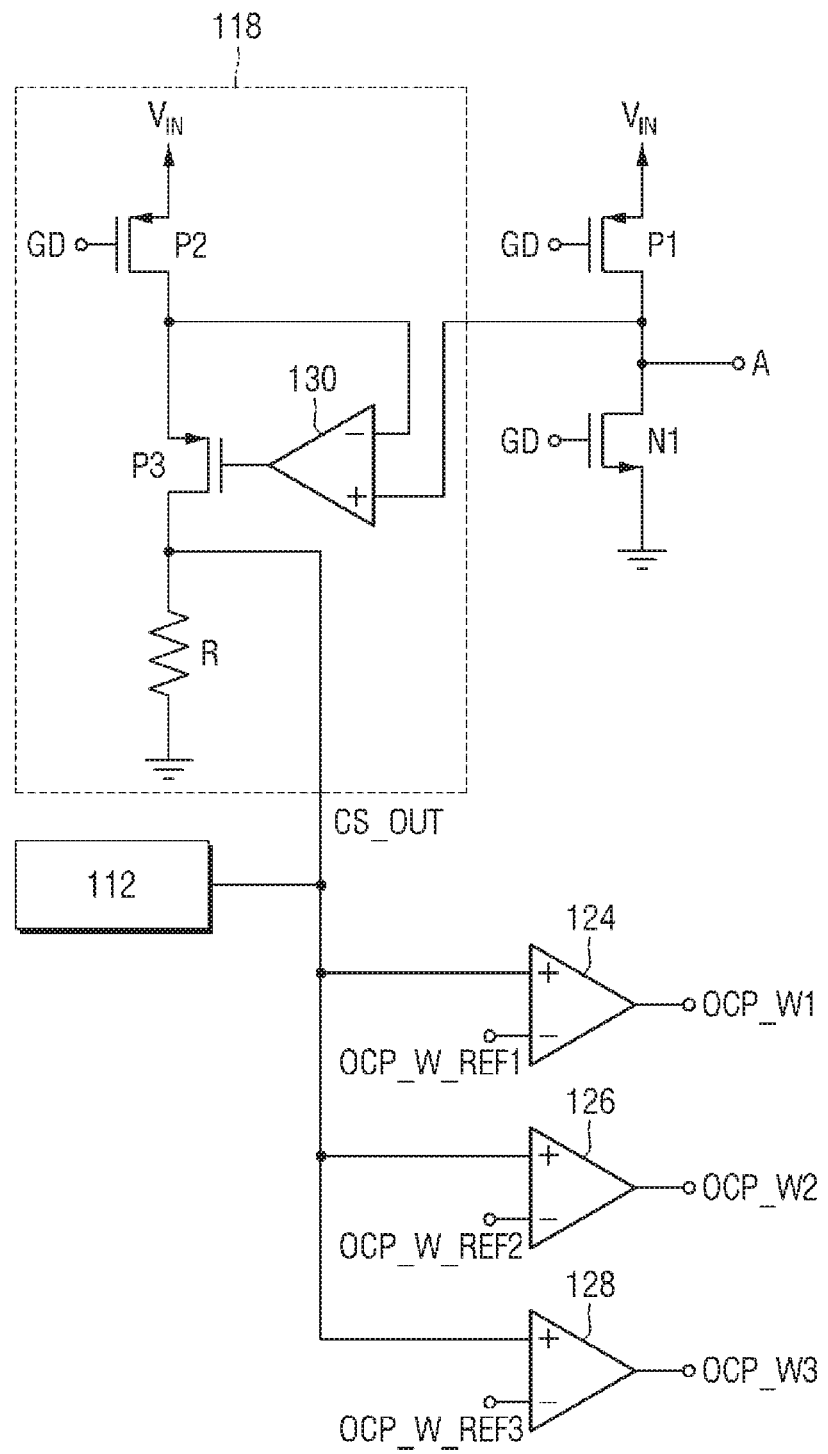
FIG. 11 is a circuit diagram of a current sensor of FIG. 10.

FIG. 11 is a circuit diagram of a current sensor of FIG. 10.

Referring to FIG. 11, a current sensor 118 senses the amount of current passing through the drain of the transistor P1 and generates the output signal CS_OUT. The current sensor 118 includes transistors P2 and P3 and an overcurrent protection output generator, which may include a comparator 130 in some example embodiments. However, in some other example embodiments, the overcurrent protection output generator may not be limited to a comparator.

The output signal CS_OUT, which is for performing overcurrent protection, is generated based on the voltage of the source of the transistor P3. The plurality of overcurrent protection output generators of VR 110 are each configured to generate output signals based on the output signal from the current sensor 118 and respective reference signals. In some example embodiments where the overcurrent protection output generators include comparators, such as the example embodiment shown in FIGS. 10 and 11, the comparator 124 compares the output signal CS_OUT and the reference signal OCP_W_REF1 and generates the output signal OCP_W1, the comparator 126 compares the output signal CS_OUT and the reference signal OCP_W_REF2 and generates the output signal OCP_W2, and the comparator 128 compares the output signal CS_OUT and the reference signal OCP_W_REF3 and generates the output signal OCP_W3.

Accordingly, in response to the amount of current passing through the drain of the transistor P1 reaching the second criterion, a third criterion, and a fourth criterion, which are lower than the first criterion for determining an overcurrent, the PMIC 100 may output the output signals OCP_W1, OCP_W2, and OCP_W3 first before cutting off the supply of an additional current to the AP 300 by the modulator 112, the control circuit 114, and the gate driver 116 of the semiconductor system 4.

Figure 12:
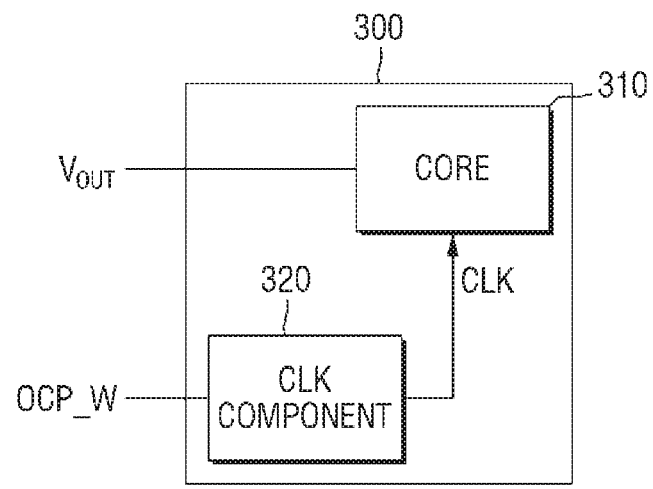
FIG. 12 is a block diagram of a semiconductor system according to another example embodiment.

FIG. 12 is a block diagram of a semiconductor system according to another example embodiment.

Referring to FIG. 12, an AP includes a clock component circuit 320, which provides a clock signal to a processing core 310.

The clock component circuit 320 controls the clock signal according to an output signal OCP_W received from a PMIC 100. For example, in response to an overcurrent being detected, the clock component circuit 320 may control the operating speed by dividing the clock signal or performing clock gating.

By reducing the amount of current consumed by the AP 300 in the aforementioned manner, a normal operation of the AP 300 may be ensured, and at the same time, an overcurrent situation may be escaped or avoided.

FIG. 12 illustrates the clock component circuit 320 as receiving only one output signal, i.e., the output signal OCP_W, from the PMIC 100, but some other example embodiments are not limited thereto. That is, in some other example embodiments, the clock component circuit 320 may additionally receive an output signal OCP from the PMIC 100 or may alternatively receive a plurality of output signals OCP_W1, OCP_W2, and OCP_W3 from the PMIC 100.

Figure 13:
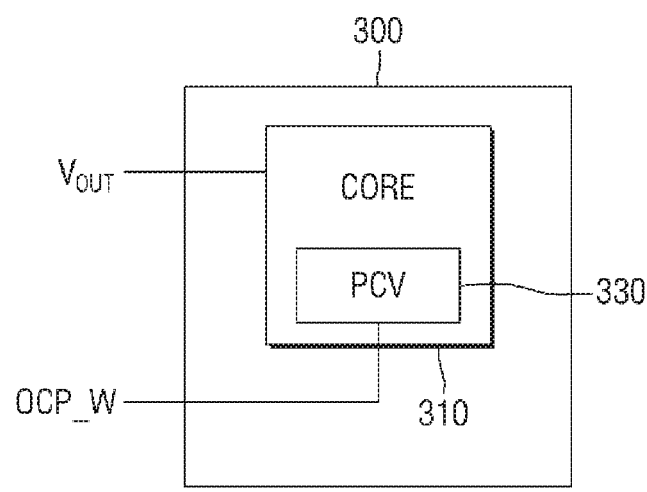
FIG. 13 is a block diagram of a semiconductor system according to another example embodiment.

FIG. 13 is a block diagram of a semiconductor system according to another example embodiment.

Referring to FIG. 13, a processing core 310 may further include a performance control unit (PCU) 330, which is configured to control performance of the processing core 310.

The PCU 330 may limit the number of instructions processed by the processing core 310. For example, in response to an overcurrent being detected, the PCU 330 may control the processing core 310 so as to process less than a predetermined number, or alternatively a desired number, of load/store instructions or may control the speed of the processing core 310 processing other instructions.

By reducing the amount of current consumed by an AP 300 in the aforementioned manner, a normal operation of the AP 300 may be ensured, and at the same time, an overcurrent situation may be escaped or avoided.

FIG. 13 illustrates the PCU 330 as receiving only one output signal, i.e., an output signal OCP_W, from a PMIC 100, but some other example embodiments are not limited thereto. That is, in some other example embodiments, the PCU 330 may additionally receive an output signal OCP from the PMIC or may alternatively receive a plurality of output signals OCP_W1, OCP_W2, and OCP_W3 from the PMIC.

While the present disclosure has been particularly illustrated and described with reference to example embodiments thereof, it will be understood by those of ordinary skill in the art that various changes in form and detail may be made therein without departing from the spirit and scope of the present disclosure as defined by the following claims. The example embodiments described herein should be considered in a descriptive sense only and not for purposes of limitation.

What is claimed is:

1. A semiconductor device, comprising:
   an inductor selectively connected to a power supply voltage and configured to store and release energy;
   a first transistor connected between the power supply voltage and the inductor and configured to provide the power supply voltage to the inductor;
   a second transistor connected to the first transistor in series, connected between the inductor and a ground voltage, and configured to provide the ground voltage to the inductor;
   a current sensor configured to sense an amount of current passing through the first transistor and generate a first output signal based on the sensed amount of current;
   an overcurrent sensor configured to sense an overcurrent passing through the inductor and generate an overcurrent signal based on the overcurrent;
   a modulator configured to provide a modulation signal to a control circuit configured to control the first and second transistors by performing pulse width modulation (PWM) based on the first output signal and the overcurrent signal;
   a first overcurrent protection output generator configured to generate a second output signal based on the first output signal of the current sensor and a first reference signal; and
   a second overcurrent protection output generator configured to generate a third output signal based on the first output signal of the current sensor and a second reference signal, the second reference signal having a different level from the first reference signal.

2. The semiconductor device of claim 1, wherein the level of the first reference signal is lower than the level of the second reference signal.

3. The semiconductor device of claim 1, wherein the current sensor is configured to provide the first output signal to the modulator.

4. The semiconductor device of claim 1, further comprising:
   a third overcurrent protection output generator configured to generate a fourth output signal based on the first output signal of the current sensor and a third reference signal, wherein the third reference signal has a different level from the first reference signal and the second reference signal.

5. The semiconductor device of claim 4, wherein the level of the first reference signal is lower than the level of the second reference signal, and wherein the level of the second reference signal is lower than the level of the third reference signal.

6. The semiconductor device of claim 1, wherein the overcurrent sensor is configured to generate the overcurrent signal based on an output voltage of the inductor and a first reference voltage.

7. The semiconductor device of claim 1, further comprising:
   a gate driver configured to provide a gate driving signal to the first and second transistors,
   wherein the control circuit is configured to receive the modulation signal from the modulator and control the gate driver.

8. The semiconductor device of claim 1, wherein the current sensor includes
   a third transistor connected to the power supply voltage and configured to be controlled by the control circuit,
   a fifth overcurrent protection output generator configured to generate a second result output signal based on an amount of current passing through a drain of the first transistor and an amount of current passing through a drain of the third transistor, and
   a fourth transistor connected to the third transistor in series and configured to be gated by the second result output signal of the fifth overcurrent protection output generator, and
   the current sensor is configured to generate the first output signal based on a voltage of a source of the fourth transistor.

9. A semiconductor device, comprising:
   a first transistor connected to a power supply voltage and configured to provide the power supply voltage to a first node;

a second transistor connected to the first transistor in series, connected between the first node and a ground voltage, and configured to provide the ground voltage to the first node;
a current sensor including,
a third transistor connected to the power supply voltage and configured to be gated by a same signal as the first transistor;
a first overcurrent protection output generator configured to generate a first result output signal based on an amount of current passing through a drain of the first transistor and an amount of current passing through a drain of the third transistor;
a fourth transistor connected to the third transistor in series and configured to be gated by the first result output signal of the first overcurrent protection output generator and to provide a first output signal, the fourth transistor being configured to generate the first output signal based on a voltage of a source of the fourth transistor;
a second overcurrent protection output generator configured to generate a second output signal based on the first output signal of the current sensor and a first reference signal; and
a third overcurrent protection output generator configured to generate a third output signal based on the first output signal of the current sensor and a second reference signal, the second reference signal having a different level from the first reference signal.

10. The semiconductor device of claim 9, wherein the level of the first reference signal is lower than the level of the second reference signal.

11. The semiconductor device of claim 9, further comprising: a modulator configured to provide a modulation signal to a control circuit configured to control the first and second transistors by performing PWM,
the fourth transistor being configured to provide the first output signal to the modulator.

12. The semiconductor device of claim 9, further comprising:
a fourth overcurrent protection output generator configured to generate a fourth output signal based on the first output signal of the current sensor and a third reference signal, wherein the third reference signal has a different level from the first reference signal and the second reference signal.

13. The semiconductor device of claim 12, wherein the level of the first reference signal is lower than the level of the second reference signal, and wherein the level of the second reference signal is lower than the level of the third reference signal.

14. The semiconductor device of claim 11, further comprising:
an inductor connected to the first node and configured to selectively receive the power supply voltage from the first transistor and to store and release energy,
wherein the modulator is configured to generate the modulation signal based on an output voltage of the inductor and a first reference voltage.

15. The semiconductor device of claim 11, further comprising:
an inductor connected to the first node and configured to selectively receive the power supply voltage from the first transistor and to store and release energy; and
a fifth overcurrent protection output generator configured to generate a second result output signal based on an output voltage of the inductor and a second reference voltage and provide the second result output signal to the modulator.

16. The semiconductor device of claim 9, further comprising:
a gate driver configured to provide a gate driving signal to the first, second, and third transistors; and
a control circuit configured to receive a modulation signal from a modulator and control the gate driver.

17. An apparatus for performing overcurrent protection while ensuring normal operation of an application processor (AP), the apparatus comprising:
a memory configured to store computer-readable instructions; and
at least one processor associated with the AP and configured to execute the computer-readable instructions to,
receive a first and a second overcurrent protection warning output signal from a semiconductor device, the first and the second overcurrent protection warning output signals each being associated with a respective overcurrent criterion;
detect respective overcurrent warning levels based on the respective overcurrent criterion associated with each of the first and the second overcurrent protection warning output signals; and
control an operating environment of a processing core disposed in the AP at a first level of intensity based on the first overcurrent protection warning output signal and at a second level of intensity based on the second overcurrent protection warning output signal and to reduce current consumption by the AP, by at least one of,
throttling operating speed of the processing core by controlling a clock signal provided to the processing core, and
controlling perform ace of the processing core by limiting a number of instructions processed by the processing core,
wherein the semiconductor device includes an inductor selectively connected to a power supply voltage and configured to store and release energy, a first transistor connected between the power supply voltage and the inductor and configured to provide the power supply voltage to the inductor, a second transistor connected to the first transistor in series, connected between the inductor and a ground voltage, and configured to provide the ground voltage to the inductor, a current sensor configured to sense an amount of current passing through the first transistor and generate a first output signal based on the sensed amount of current, an overcurrent sensor configured to sense an overcurrent passing through the inductor and generate an overcurrent signal based on the overcurrent, a modulator configured to provide a modulation signal to a control circuit configured to control the first and second transistors by performing pulse width modulation (PWM) based on the first output signal and the overcurrent signal, a first overcurrent protection output generator configured to generate the first overcurrent protection warning output signal based on the first output signal of the current sensor and a first reference signal, and a second overcurrent protection output generator configured to generate the second overcurrent protection warning output signal based on the first output signal of the current sensor and a second reference signal, the second reference signal having a different level from the first reference signal.

18. The apparatus of claim 17, wherein the at least one processor is configured to execute the computer-readable instructions to, receive an third overcurrent protection warning output signal from the semiconductor device, the third overcurrent protection warning output signal being associated with an overcurrent criterion having a higher level than the respective overcurrent criterion associated with each of the first and the second overcurrent protection warning output signals;

control the operating environment of the processing core disposed in the AP at the first level of intensity in response to detecting a first overcurrent warning level based on a first overcurrent criterion associated with the first overcurrent protection warning output signal;

control the operating environment of the processing core disposed in the AP at the second level of intensity having a higher level than the first level of intensity in response to detecting a second overcurrent warning level having a higher level than the first overcurrent warning level based on a second overcurrent criterion associated with the second overcurrent protection warning output signal; and control the operating environment of the processing core disposed in the AP at a third level of intensity having a higher level than the second level of intensity in response to detecting a third overcurrent warning level having a higher level than the second overcurrent warning level based on a third overcurrent criterion associated with the third overcurrent protection warning output signal, wherein the semiconductor device further includes a third overcurrent protection output generator configured to generate the third overcurrent protection warning output signal based on the first output signal of the current sensor and a third reference signal, wherein the third reference signal has a different level from the first reference signal and the second reference signal.

19. The apparatus of claim 17, wherein the at least one processor is further configured to execute the computer-readable instructions to, receive an third overcurrent protection warning output signal from the semiconductor device, the third overcurrent protection warning output signal being associated with an overcurrent criterion having a higher level than the respective overcurrent criterion associated with each of the first and the second overcurrent protection warning output signals;

detect an overcurrent condition based on the overcurrent criterion associated with the third overcurrent protection warning output signal; and control the operating environment of the processing core disposed in the AP at a highest level of intensity based on the overcurrent condition by terminating driving of the processing core, wherein the semiconductor device further includes a third overcurrent protection output generator configured to generate the third overcurrent protection warning output signal based on the first output signal of the current sensor and a third reference signal, wherein the third reference signal has a different level from the first reference signal and the second reference signal.

* * * * *